United States Patent
Faden

(10) Patent No.: US 9,285,280 B2
(45) Date of Patent: Mar. 15, 2016

(54) SYSTEMS AND METHODS OF DETERMINING LOAD TEMPERATURES

(71) Applicant: Joel S. Faden, Rockville, MD (US)

(72) Inventor: Joel S. Faden, Rockville, MD (US)

(*) Notice: Subject to any disclaimer, the term of this patent is extended or adjusted under 35 U.S.C. 154(b) by 378 days.

(21) Appl. No.: 13/789,014

(22) Filed: Mar. 7, 2013

(65) Prior Publication Data

US 2014/0254625 A1 Sep. 11, 2014

(51) Int. Cl.
*G01K 7/42* (2006.01)

(52) U.S. Cl.
CPC .......................................... *G01K 7/42* (2013.01)

(58) Field of Classification Search
CPC ........... G01K 13/00; G01K 7/42; G01K 3/08; G01K 7/02; G01K 17/00; G01K 17/04; G01K 2207/02; G01K 2215/00
USPC .................................................. 374/100, 101
See application file for complete search history.

(56) References Cited

U.S. PATENT DOCUMENTS

| | | | |
|---|---|---|---|
| 3,813,937 A * | 6/1974 | Fletcher et al. | 374/34 |
| 3,973,102 A | 8/1976 | Macklem | |
| 3,995,485 A * | 12/1976 | Beyer et al. | 374/33 |
| 4,788,398 A * | 11/1988 | Hornung | 219/483 |
| 5,097,759 A | 3/1992 | Vilgrain et al. | |
| 5,539,185 A | 7/1996 | Polster | |
| 5,542,344 A | 8/1996 | Koether et al. | |
| 5,590,587 A * | 1/1997 | Polster | 99/403 |
| 5,643,528 A | 7/1997 | Le Gras | |
| 5,882,499 A | 3/1999 | Bonnardel et al. | |
| 2002/0172256 A1* | 11/2002 | Yu | 374/141 |
| 2008/0211510 A1* | 9/2008 | Zolock et al. | 324/451 |
| 2009/0038595 A1* | 2/2009 | Arlt et al. | 123/676 |
| 2009/0144014 A1* | 6/2009 | Aljabari | 702/130 |
| 2009/0183677 A1* | 7/2009 | Tian et al. | 118/667 |
| 2009/0310645 A1* | 12/2009 | Kofuji et al. | 374/12 |
| 2011/0205071 A1* | 8/2011 | Namekawa et al. | 340/588 |
| 2011/0301777 A1* | 12/2011 | Cox et al. | 700/299 |
| 2012/0269227 A1* | 10/2012 | Stothers | 374/3 |
| 2013/0048625 A1* | 2/2013 | Sladecek et al. | 219/494 |

FOREIGN PATENT DOCUMENTS

EP 1159658 12/2001

* cited by examiner

*Primary Examiner* — Lisa Caputo
*Assistant Examiner* — Philip Cotey
(74) *Attorney, Agent, or Firm* — Duane Morris LLP

(57) ABSTRACT

Systems and computer-implemented methods of determining a temperature of a load introduced into a chamber are provided. The computer-implemented method includes applying a power output to a medium in at least a portion of a chamber at a level to modify the temperature of the medium to achieve a predetermined medium temperature. A steady state power output level to achieve the predetermined medium temperature is determined using a computer processor. A load having a load temperature other than the predetermined medium temperature is received into the at least a portion of the chamber. The method includes determining that the load temperature is substantially at the predetermined medium temperature using the computer processor when the power output level reaches the determined steady state power output level and without any direct temperature measurement of the load.

18 Claims, 7 Drawing Sheets

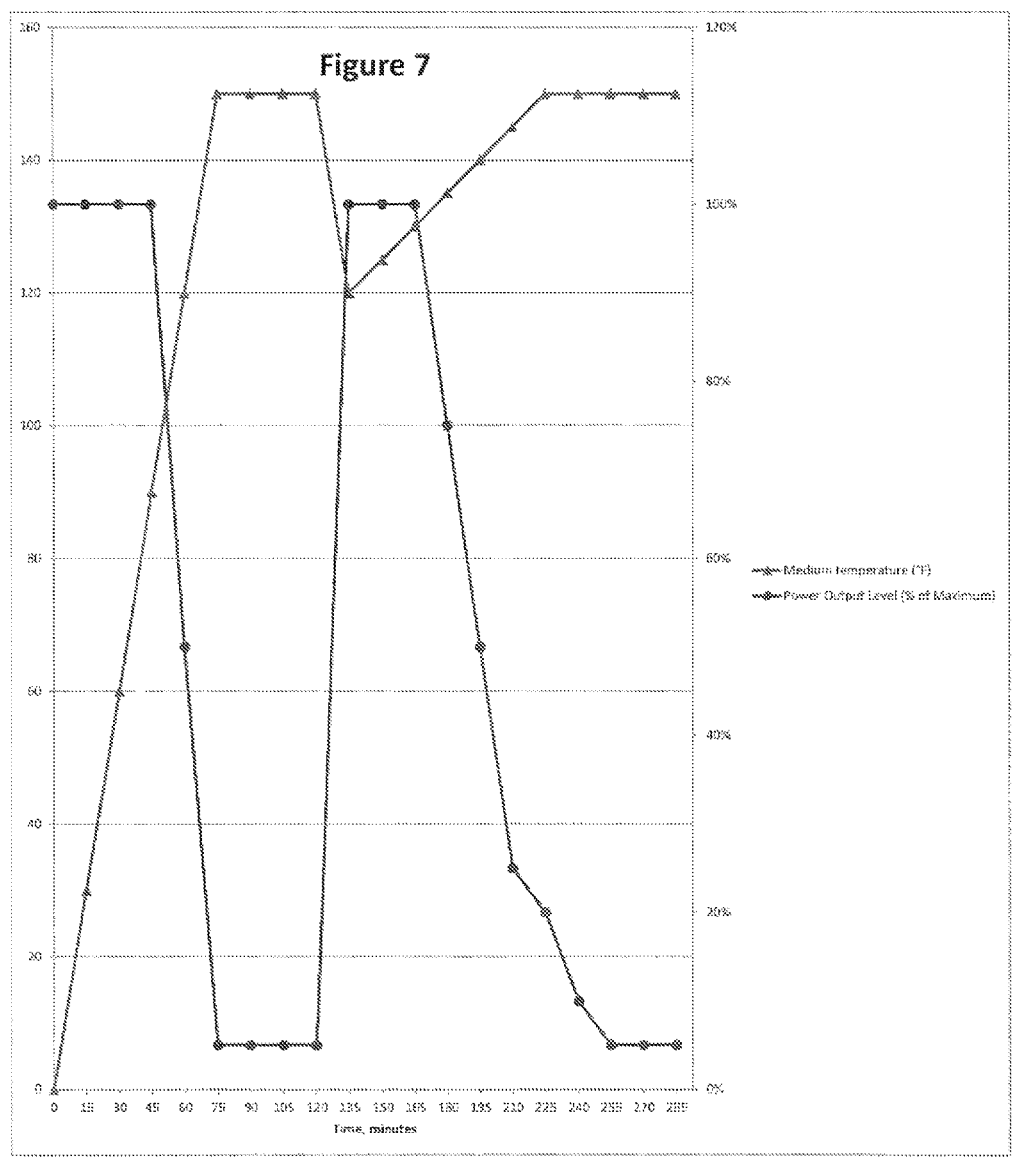

SYSTEMS AND METHODS OF DETERMINING LOAD TEMPERATURES

FIELD OF THE INVENTION

The present disclosure is directed generally to thermodynamic processes and more particularly to systems and methods of determining temperatures of loads introduced into media in chambers.

DESCRIPTION OF THE RELATED ART

Conventional processes involving the introduction of a load into a liquid or gas medium in a chamber in order to heat or cool the load to a desired temperature require direct temperature measurements of the load in order to determine the load temperature. However, these direct temperature measurements can be very difficult or costly to obtain or may destroy the integrity of the load before it reaches the desired temperature.

For example, in sous vide ("under vacuum") cooking techniques, sealed cooking pouches are introduced into water containment chambers to heat the food products in the respective cooking pouches. The quality of the food products is often lost due to inaccuracies in temperature control and in determining the temperature of the food product in the cooking pouch. Special purpose probes inserted into the sealed pouches have been used to determine the temperature of the food products but are costly and result in a breach of the integrity of the food pouch which reduces food quality. When cooking using sous vide cooking techniques, errors of 5° Fahrenheit can cause detrimental changes to the texture of many food products. Conventional techniques also involve the use of serial pre-heating and heating chambers which are independently temperature controlled at a first, lower temperature and a second, higher temperature. In such techniques, the sealed pouch is heated in the pre-heating chamber at a lower temperature for a predetermined period of time and then removed and quickly heated again immediately prior to serving at a high temperature and for a shorter, predetermined period of time. Such techniques are very time and resource intensive and continue to suffer from inaccurate load temperature estimations.

SUMMARY OF THE INVENTION

In one embodiment, a computer-implemented method of determining a temperature of a load introduced into a chamber, is provided that includes: applying a power output to a medium in at least a portion of a chamber at a level to modify the temperature of the medium to achieve a predetermined medium temperature. A steady state power output level is determined using a computer processor to achieve the predetermined medium temperature. The load having a load temperature other than the predetermined medium temperature is received into the at least a portion of the chamber, where it is determined that the load temperature is substantially at the predetermined medium temperature when the power output level reaches the determined steady state power output level using the computer processor and without any direct temperature measurement of the load.

A system is provided for determining a temperature of a load introduced into a chamber that includes a chamber comprising a medium in at least a portion of the chamber and an input device to provide a set point temperature for the medium. A temperature modifying device is included to modify the temperature of the medium in the at least a portion of the chamber to the set point temperature. A temperature determining device is provided so as to determine the temperature of the medium in the at least a portion of the chamber. A power output level determining device is included in the system so as to determine the power output level provided to the temperature modifying device. A computer-readable storage medium, having instructions stored therein, is included in the system wherein the instructions, when executed by a computer processor, (i) cause the computer processor to: receive an input from the temperature determining device and the input device and to provide a power output level to the temperature modifying device; (ii) receive a steady state power output level input to achieve the set point temperature from the power output level determining device; (iii) receive a medium temperature input from the temperature determining device after a load having a temperature other than the set point temperature is received into the at least a portion of the chamber; and (iv) determine that the load temperature is substantially at the set point temperature when the power output level determining device provides an indication that the power output level has returned to the received steady state power output level and without receiving any direct temperature measurement input of the load.

In a further embodiment, a computer-implemented method of determining a temperature of a load introduced into a chamber is provided that includes introducing a medium into one or more of a plurality of sub-chambers of a chamber and applying a power output to the respective medium of the one or more sub-chambers at a level to modify the temperature of the respective medium to achieve a respective predetermined medium temperature. The respective medium temperature is monitored in the one or more sub-chambers. The respective power output level applied to the respective medium of the one or more sub-chambers is monitored so as to determine a respective steady state power output level to achieve the respective predetermined medium temperature in the one or more sub-chambers using the respective monitored medium temperature and the respective monitored power output level as inputs to a computer processor. The respective load is received having a load temperature other than the predetermined medium temperature into each of the one or more sub-chamber, and the respective load temperature is determined to be substantially at the respective predetermined medium temperature using the computer processor when the respective power output level reaches the respective determined steady state power output level and without any direct temperature measurement of the respective load. The invention provides an improved method for determining the safety for human consumption of food products prepared via a machine implemented sous-vide process.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

FIG. 7 is a diagram illustrating an example of a relationship between medium temperature, time and power output level for determining a load temperature.

DETAILED DESCRIPTION OF THE EXAMPLES

Figure 1:
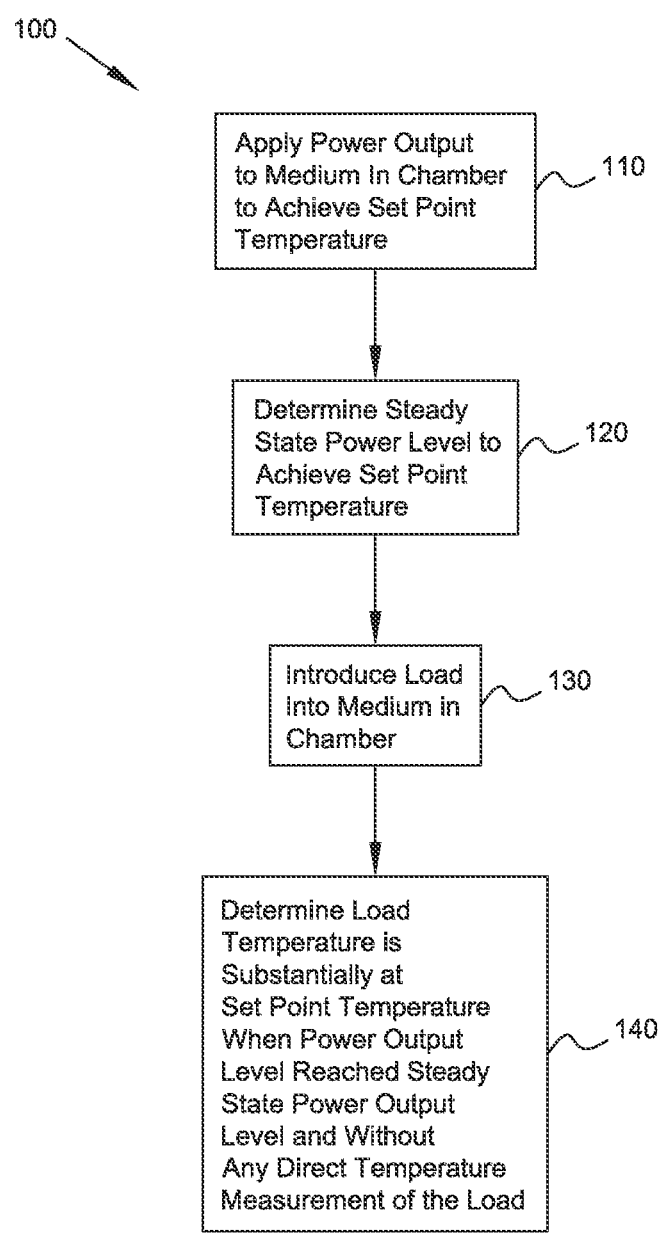
FIG. 1 is a flow chart illustrating a method of determining a load temperature according to embodiments of the present disclosure.

With reference to the Figures, where like elements have been given like numerical designations to facilitate an understanding of the drawings, the various embodiments of cyclic deposition and etch methods are described. The figures are not drawn to scale.

The following description is provided as an enabling teaching of a representative set of examples. Many changes can be made to the embodiments described herein while still obtaining beneficial results. Some of the desired benefits discussed below can be obtained by selecting some of the features or steps discussed herein without utilizing other features or steps. Accordingly, many modifications and adaptations, as well as subsets of the features and steps described herein are possible and can even be desirable in certain circumstances. Thus, the following description is provided as illustrative and is not limiting.

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. The term "adjacent" as used herein to describe the relationship between structures/components includes both direct contact between the respective structures/components referenced and the presence of other intervening structures/components between respective structures/components.

As used herein, use of a singular article such as "a," "an" and "the" is not intended to exclude pluralities of the article's object unless the context clearly and unambiguously dictates otherwise.

Improved methods and systems of determining load temperatures are provided. The processes described herein are not limited to any specific medium (e.g. liquid or gas) or any specific medium-based system (e.g. heating, refrigerating, circulating, non-circulating, closed loop or open loop), etc. The inventor has developed methods and systems of precisely and accurately determining load temperatures without any direct temperature measurement of the load itself.

The inventor has observed that by determining a system's steady state power output level to achieve and maintain a predetermined medium temperature of a medium in a chamber of the system and by monitoring the power output level following the introduction of a load into the medium of the chamber, the temperature of the load can be determined without any direct temperature measurement of the load. As used herein, a load is an item that is introduced and received into a medium and having a temperature that is affected (e.g. raised or lowered) by the temperature of the surrounding medium. The inventors have determined that the methods and systems of determining load temperatures described herein offer significant improvements in a wide variety of applications, including, for example, sous vide cooking applications to precisely and accurate determine the load temperatures of loads including, for example, food products in sealed packages such as sous vide packages.

FIG. 1 is a flow chart illustrating a method 100 of determining a load temperature according to embodiments of the present disclosure. At block 110, a power output is applied to a medium in a chamber to achieve a predetermined medium temperature (e.g. a set point temperature). In some embodiments, the medium is a liquid (e.g. water) in a bath chamber. In other embodiments, the medium is gaseous (e.g. air) in a gaseous chamber. In some embodiments, the chamber is insulated. In some embodiments, the system including the chamber is a closed system. In some embodiments, the chamber can include a plurality of sub-chambers. Any suitable medium can be provided into the chamber. For example, the chamber can be a tank or a vat for heating a sealed food pouch in a sous vide cooking technique and the medium can be water in the chamber. In some embodiments, a medium is provided into one or more sub-chambers of a chamber. A power output can be applied to raise or lower the medium temperature to achieve a predetermined medium temperature. In some embodiments, a temperature modifying device (e.g. a heating element) can be provided in one or more portions of the chamber to heat the surrounding medium. Any suitable heating element (e.g. gas heating element, electrical heating element, air-to-water heat exchanger, water-to-water heat exchanger, water-to-air heat exchanger, radiant heat lamp, a reflective surface, a resistive heating element, an RF induction heating element with a conductive susceptor) can be provided.

In some embodiments, a cooling element can be provided in one or more portions of the chamber to cool the surrounding medium. Any suitable cooling element (e.g. gas cooling element, electric cooling element, air-to-water heat exchanger, water-to-water heat exchanger, water-to-air heat exchanger) can be provided. In some embodiments, multiple heating or cooling elements are provided to heat or cool the medium at various portions of the chamber. In some embodiments, a circulating device (e.g. circulating pump, air blower, etc.) to circulate or agitate the medium in the chamber. In some embodiments, one or more respective temperature modifying devices (e.g. heating element, cooling element, etc.) can be provided in one or more sub-chambers of a chamber to heat the respective medium in the sub-chamber.

A predetermined medium temperature (e.g. set point temperature) can be any suitable temperature for a particular application. In some embodiments, a predetermined medium temperature can be a predetermined temperature to heat a load. In some embodiments, a predetermined medium temperature can be a predetermined temperature to cool a load. In sous vide cooking techniques, for example, a predetermined medium temperature can be a temperature between approximately 120° Fahrenheit and approximately 180° Fahrenheit (e.g. 175 and 185° Fahrenheit) and is based on the load, i.e. the sealed pouch and specifically the type of food product sealed in the pouch. One major problem with sous-vide cooking is that one generally does not know when the food reaches the bath temperature and thereby has reached an appropriate "pasteurization temperature". Time/temperature curves for determining the appropriate period of time that a food must be maintained at a specified temperature to kill bacteria and parasites are well known in the art. Thus, with the method of the invention when a food product has reached a predetermined medium temperature, application of known time/temperature curves will allow for the use of a timer in the system and method of the invention to measure the time the food in the bath is maintained at the temperature specified for ensuring harmful bacteria and parasites are neutralized.

In some embodiments, the predetermined medium temperature can be provided and input by an input device for a load. For example, in some embodiments, a predetermined medium temperature can be provided in memory for one or more loads and provided as an input to a processor (e.g. in a temperature controller). In some embodiments, a predetermined medium temperature can be provided and input by a keyboard, pointing device, e.g., a mouse or a trackball, or any suitable device, including, but not limited to, a device providing an acoustic, speech, or tactile input. In some embodiments, a respective predetermined medium temperature can be provided for one or more sub chambers in a chamber. In some embodiments, a respective input device can provide a respective predetermined medium temperature for the respective medium in each respective sub-chamber of a chamber.

A power output can be applied to one or more heating elements or one or more cooling elements in a medium in a chamber to raise or lower the temperature of the medium. In some embodiments, a power output is applied to raise the medium temperature. In some embodiments, a power output is applied to lower the medium temperature. In some embodiments, a respective power output is applied to one or more respective heating elements or one or more respective cooling elements in a respective medium in one or more sub-chambers of a chamber to raise or lower the temperature of the respective medium. In some embodiments, one or more temperature determining devices (e.g. temperature sensors) can be provided in the chamber to detect the temperature of the surrounding medium and provide an output signal indicating the temperature of the surrounding medium. In some embodiments, multiple temperature sensors are provided to detect the medium temperature at various portions of the chamber. Any suitable temperature determining device can be provided such as, for example, a temperature sensor, a thermocouple, a pyrometer, a thermistor, a resistance temperature detector (RTD), a platinum resistance thermometer (PRT), or any suitable temperature determining device.

In some embodiments, one or more temperature determining devices provide output signals to a computer processing unit (e.g. of a temperature controller such as, for example a thermostat) indicating the medium temperature at one or more portions of the chamber. A processing unit can received input signals from one or more temperature determining devices and process the signals to determine a temperature of the medium, or of a portion of the medium. Any suitable determining method can be used. For example, the processing unit can determine an average (e.g. a simple arithmetic average, weighted average, exponential average) of the temperatures provided by input signals from two or more temperature determining devices to determine the temperature of at least a portion of the medium, for example the medium surrounding the area of the chamber for introduction and reception of the load. In some embodiments, one or more respective temperature determining devices can be provided in one or more sub-chambers of a chamber to detect the temperature of the respective surrounding medium and provide a respective output signal indicating the temperature of the respective surrounding medium.

In some embodiments, steps of the method 100 are performed to maintain a substantially constant medium temperature at the predetermined medium temperature. In some embodiments, a processing unit (e.g. of a temperature controller) receives a predetermined medium temperature input from an input device and one or more input signals from one or more temperature determining devices and provides a signal to one or more temperature modifying devices in the chamber (e.g. heating or cooling element) to heat or cool the medium to achieve the predetermined medium temperature. In some embodiments, the processing unit (e.g. of a temperature controller) is programmed to achieve a medium temperature within a predetermined range (e.g. 0.05 to 2° Fahrenheit) using the one or more temperature modifying devices and as measured using the one or more temperature determining devices.

The inventors have observed that by measuring the power output level required by the processing unit (e.g. of a temperature controller), and provided by the one or more temperature modifying devices to achieve the predetermined medium temperature, an accurate and precise load temperature can be determined without any direct temperature measurement of the load. The inventors have observed that by determining the steady state power output level to achieve and maintain a medium temperature of a system at a predetermined medium temperature, a temperature of a load received into the system can be determined without any direct temperature measurement of the load and by monitoring the power output level and determining when the power output level returns to the determined steady state power output level.

At block 120, a steady state power output level to achieve a predetermined medium temperature is determined. In some embodiments, a processing unit receives a power output level signal from one or more temperature modifying devices in the chamber (e.g. heating or cooling elements). In some embodiments, a processing unit can receive a power output level signal from a processing unit (e.g. of a temperature controller). In some embodiments, the processing unit receives a timing parameter input from an input device, e.g. from a memory input or any suitable input. In some embodiments, the timing parameter can be an input for measuring a power output level for a predetermined period of time. In some embodiments, the processing unit further receives a predetermined medium temperature input from an input device and one or more input signals from one or more temperature determining devices and provides a signal to one or more temperature modifying devices in the chamber (e.g. heating or cooling element) to heat or cool the medium to achieve the predetermined medium temperature. As used herein, a steady state power output level (e.g. output by the one or more temperature modifying devices) is the power output level required to maintain the medium temperature substantially constant about the predetermined medium temperature (e.g. set point temperature) given system errors and/or system natural losses of energy. In some embodiments, a steady state power output level is a system power output level (e.g. output by the one or more temperature modifying devices) required to maintain the medium temperature substantially constant about the predetermined medium temperature for a predetermined period of time. In some embodiments, a steady state power output level is a system power output level (e.g. output by the one or more temperature modifying devices) required to maintain the medium temperature substantially constant about the predetermined medium temperature and the power output level substantially constant for a predetermined period of time.

In some embodiments, the processing unit can receive a steady state temperature parameter (e.g. +/−0.01 to 2° Fahrenheit) input and/or a steady state power output level parameter input (e.g. +/−0.01 to 1% of maximum power output level) from an input device for determining the steady state power output level. In some embodiments, a steady state power output level is a system power output level (e.g. output by the one or more temperature modifying devices) required to maintain the medium temperature substantially constant about the predetermined medium temperature (e.g. set point temperature) using the steady state temperature parameter for a predetermined period of time. In some embodiments, a steady state power output level is a system power output level (e.g. by the one or more temperature modifying devices) required to maintain the medium temperature substantially constant about the predetermined medium temperature (e.g. set point temperature), using the steady state temperature parameter, for a predetermined period of time. In some embodiments, the determined steady state power level for the medium of a chamber can be stored, for example, in memory or other storage device. In some embodiments, the determined steady state power level for respective mediums in one or more sub chambers of a chamber can be stored, for example, in memory or any suitable other storage device.

At block 130, a load is introduced and received into the medium in the chamber. As described herein, a load is introduced and received into the medium in at least a portion of the chamber and has a load temperature other than a predetermined medium temperature (e.g. set point temperature) such that the load temperature is affected (e.g. raised or lowered) by the temperature of the surrounding medium. Any suitable method of introducing the load into the medium can be provided. In some embodiments, a plurality of loads having respective load temperatures other than the predetermined medium temperature can be introduced into one or more portions of the chamber at substantially the same time. In some embodiments, the surrounding medium temperature is affected (e.g. raised or lowered) by the receiving of the load into the medium In some embodiments, after reception of the load, a processing unit (e.g. in a temperature controller) receives one or more input signals from one or more temperature determining devices in the medium in the chamber and provides a signal to one or more temperature modifying devices in the chamber (e.g. heating or cooling element) to heat or cool the medium to achieve a predetermined medium temperature (e.g. a set point temperature.) In some embodiments, a processing unit receives a power output level signal from the one or more temperature modifying devices in the chamber (e.g. heating or cooling elements) as they heat or cool the medium to achieve a predetermined medium temperature (e.g. a set point temperature).

Referring now to block 140, the load temperature is determined to be substantially at the predetermined medium temperature (e.g. a set point temperature) when the power output level reaches the determined steady state power output level and without any direct temperature measurement of the load. In some embodiments, a processing unit can receive the determined steady state power output level for the respective medium as an input from a memory, or other suitable storage device. In some embodiments, a processing unit can receive a determined steady state power output level input for the respective medium and power output level signals from the one or more temperature modifying devices in the respective medium in the chamber as they heat or cool the medium to return the respective medium to the predetermined medium temperature. In some embodiments, a processing unit can receive a respective determined steady state power output level input for the respective medium and respective power output level signals from the one or more temperature modifying devices in the respective medium in one or more sub-chambers in the chamber as they heat or cool the respective medium to return the respective medium to the predetermined medium temperature. In some embodiments, a processing unit determines that the load temperature is at the predetermined medium temperature when it receives an input signal indicating that the medium temperature is substantially constant about the predetermined medium temperature and a signal indicating that the power output level has reached the determined steady state power output level. In some embodiments, the signal indicating that the power output level has reached the determined steady state power output level further indicates that the power output level is substantially constant for a predetermined period of time.

Figure 2:
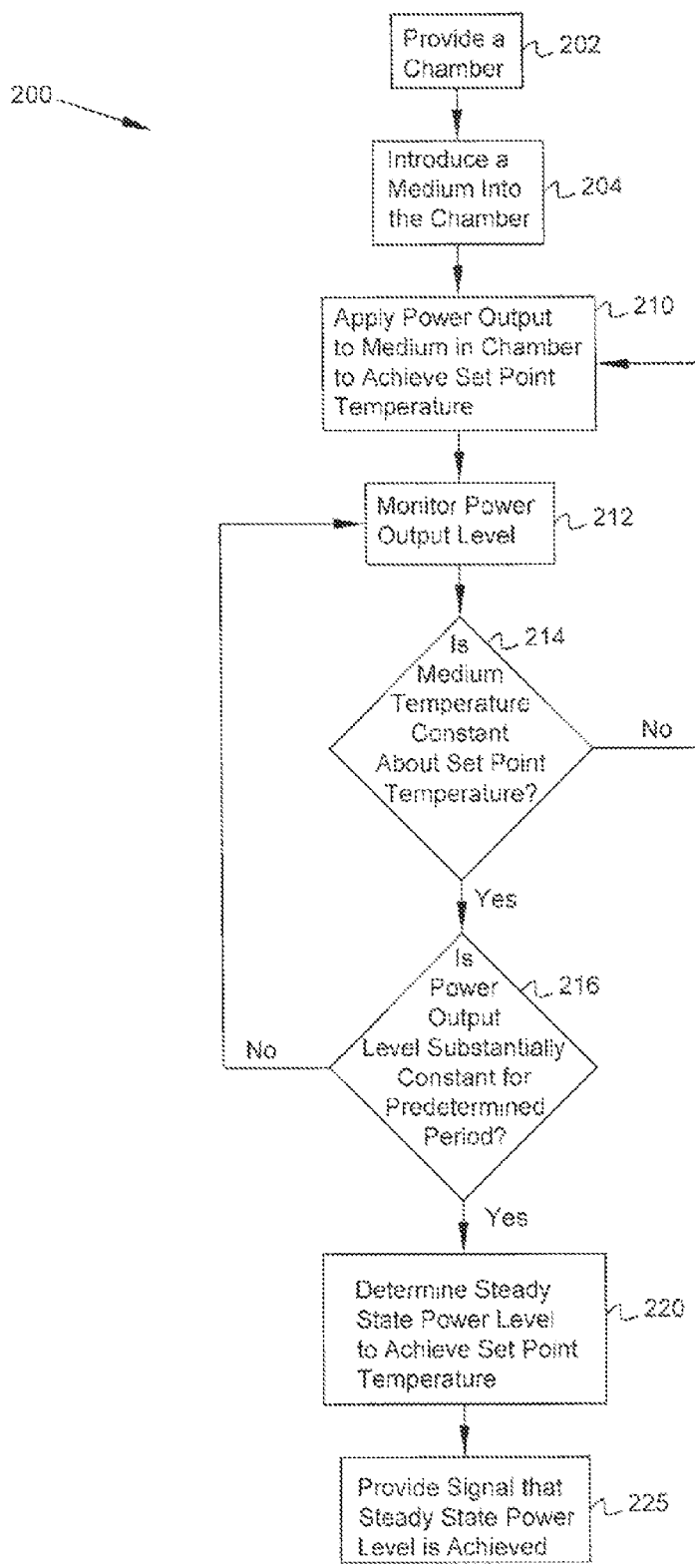
FIG. 2 is a flow chart illustrating a method of determining a steady state power output level according to some embodiments.

With reference now to FIG. 2, a flow chart illustrating a method 200 of determining a steady state power output level according to embodiments of the present disclosure is provided. At block 202, a chamber is provided. As described for block 110, any suitable chamber can be provided including, but not limited to, a liquid bath chamber, a gaseous chamber, a chamber having a plurality of sub chambers, etc. At block 204, a medium is introduced into the chamber. Any suitable method of introduction of the medium into the chamber can be provided. For example, a liquid medium can be introduced into the chamber, portion of the chamber, or sub chamber, by operating a valve connected to a holding tank or other suitable liquid source. Any suitable method of operating a valve can be provided including, but not limited to, solenoid, hydraulic, pneumatic, electrical, manual, etc. In some embodiments, a gaseous medium can be introduced into the chamber, portion of a chamber, or sub chamber, by operating a valve connected to a gaseous cylinder or other suitable gaseous source. At block 210, a power output can be applied to a medium in a chamber to achieve a predetermined medium temperature as described for block 110.

At block 212, the power output level applied to the medium in the chamber is monitored. In some embodiments, a signal providing power output level is received by a processing unit from one or more temperature modifying devices. In some embodiments, a signal providing power output level is received by a processing unit from a processing unit (e.g. of a temperature controller). In some embodiments, the medium temperature is monitored. For example, in some embodiments, a processing unit (e.g. of a temperature controller) receives one or more input signals from one or more temperature determining devices. At block 214, a determination is made as to whether the monitored medium temperature is substantially constant about the predetermined medium temperature. In some embodiments, a processing unit (e.g. of a temperature controller) receives a predetermined medium temperature input from an input device, one or more input signals from one or more temperature determining devices, a steady state temperature parameter input and/or a timing parameter input from an input device for determining whether the medium temperature is substantially constant about the predetermined medium temperature (e.g. set point temperature). In some embodiments, the processing unit can provide a signal indicating that the medium temperature is substantially constant about the predetermined medium temperature. In the illustrated embodiment, at block 214, if the processing unit determines that the medium temperature is not at, or substantially constant about, the predetermined medium temperature, the processing unit provides a signal to one or more temperature modifying devices in the chamber (e.g. heating or cooling element) to heat or cool the medium to achieve the predetermined medium temperature At block 216, a determination is made as to whether the power output level is substantially constant for a predetermined period of time. If the power output level is determined not to have been substantially constant for a predetermined period of time, the power output level continues to be monitored. At block 220, the steady state power output level to achieve the predetermined medium temperature is determined as described above for block 120. In some embodiments, the determined steady state power level for the medium of a chamber (or for a respective portion or sub-chamber of a chamber) can be stored, for example, in memory or other suitable storage device. At block 225, a signal can be provided to indicate that the steady state power level is achieved. For example, once a processing unit determines that the steady state power level for the medium of a chamber (or for a respective portion or sub-chamber of a chamber) has been achieved, it can provide a signal to a signal indicating device to indicate this state. In some embodiments, the signal indicating device can provide a signal to a display to display the respective determined steady state power level.

Figure 3:
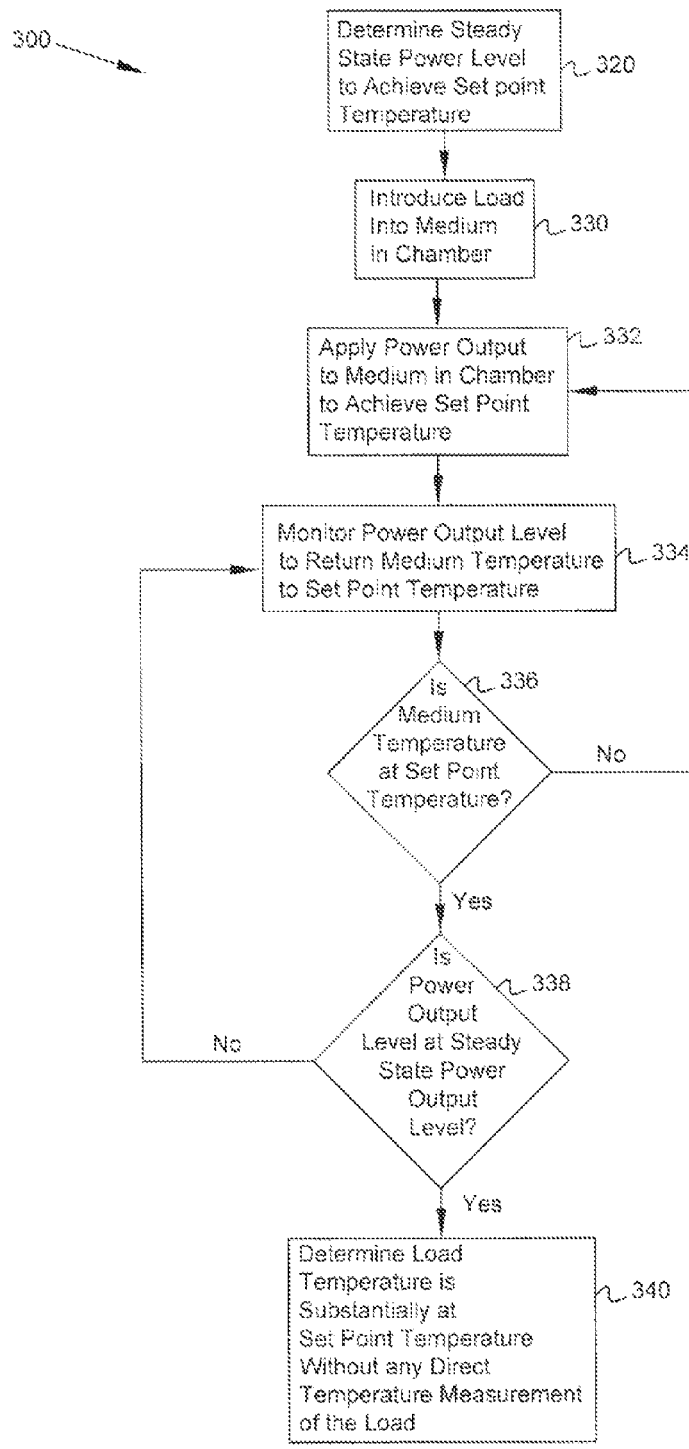
FIG. 3 is a flow chart illustrating a method of determining a load temperature according to some embodiments.

Referring now to FIG. 3, a flow chart illustrating a method of determining a load temperature is provided. At block 320, a steady state power output level to achieve the predetermined medium temperature (e.g. set point temperature) is determined as described above for blocks 120 and 220. A load is introduced into the medium in the chamber as described above for block 130. At block 332, a power output level is applied to the medium in the chamber to achieve the predetermined medium temperature as described above for blocks 210, 110 and 130. At block 334, a power output level is monitored to return the medium temperature to the predetermined medium temperature. In some embodiments, a processing unit can receive a determined steady state power output level for the respective medium as an input from a memory, or other suitable storage device and power output level signals from the one or more temperature modifying devices, or a processing unit (e.g. of a temperature controller) in the respective medium in the chamber as the temperature modifying devices heat or cool the medium to return the respective medium to the predetermined medium temperature.

At block 336, a determination is made as to whether the medium temperature has reached the predetermined medium temperature. If a negative determination is made, power output level is applied to the medium in the chamber to achieve the predetermined medium temperature at block 332. If a positive determination is made, a determination is made at block 338 as to whether the power output level has reached the steady state power output level. In some embodiments, a processing unit can receive the determined steady state power output level for the respective medium as an input from a memory, or other suitable storage device and power output level signals from one or more temperature modifying devices in the respective medium in the chamber, or a processing unit (e.g. of a temperature controller) as they heat or cool the medium to return the respective medium to the predetermined medium temperature. In some embodiments, a processing unit can receive a respective determined steady state power output level input for the respective medium and respective power output level signals from the one or more temperature modifying devices in the respective medium in one or more sub-chambers in the chamber as they heat or cool the respective medium to return the respective medium to the predetermined medium temperature. If the determination at block 338 is negative, a power output level is monitored to return the medium temperature to the predetermined medium temperature at block 334.

If the determination at block 338 is positive, the load temperature is determined to be substantially at the predetermined medium temperature (e.g. a set point temperature) when the power output level reaches the determined steady state power output level and without any direct temperature measurement of the load as described for block 140. In some embodiments, a processing unit determines that the load temperature is substantially at the predetermined medium temperature when it receives an input signal indicating that the medium temperature is substantially constant about the predetermined medium temperature and a signal indicating that the power output level has reached the determined steady state power output level. In some embodiments, the signal indicating that the power output level has reached the determined steady state power output level further indicates that the power output level is substantially constant for a predetermined period of time.

Figure 4A:
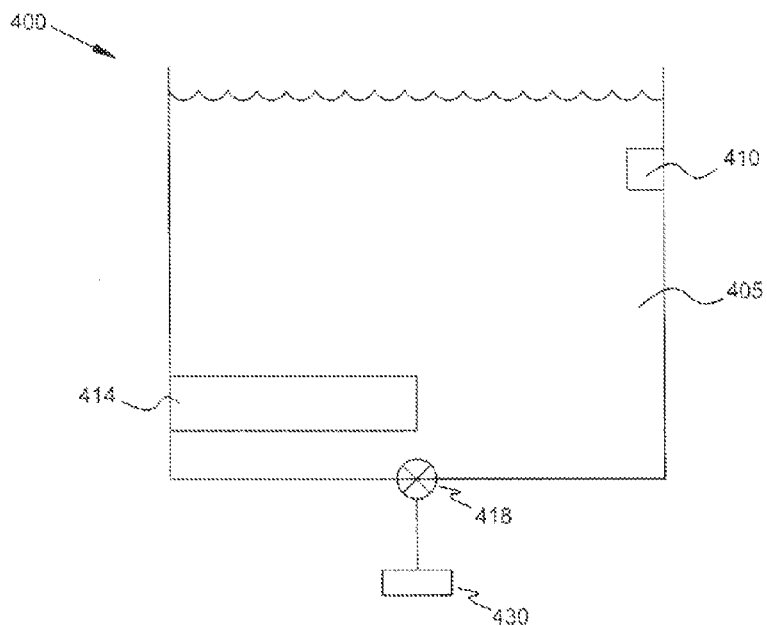
FIG. 4A is a front plan view of an example of a portion of a system for determining a load temperature according to some embodiments.

Referring now to FIG. 4A, a front plan view of an example of a portion of a system for determining a load temperature according to some embodiments is provided. In the illustrated embodiment, the system 400 includes a chamber 410. As shown, the chamber 410 can include a medium 415 in the chamber 410. In the illustrated embodiment, the medium 415 is a liquid medium. As shown in FIG. 4A, the medium can be introduced into the chamber using a valve 418 that can be connected to a holding tank 430. One or more temperature determining devices 416 can be provided to determine the temperature of the medium 415 in the chamber 410. One or more temperature modifying device 414 can be provided to modify the temperature of the medium 415 in the chamber 410 to a predetermined medium temperature. In some embodiments, system 500 can include one or more medium level determining devices (not shown) (e.g. a high medium level determining device and a low medium level determining device) to determine the level of the medium 415 at one or more portions of chamber 410.

Figure 4B:
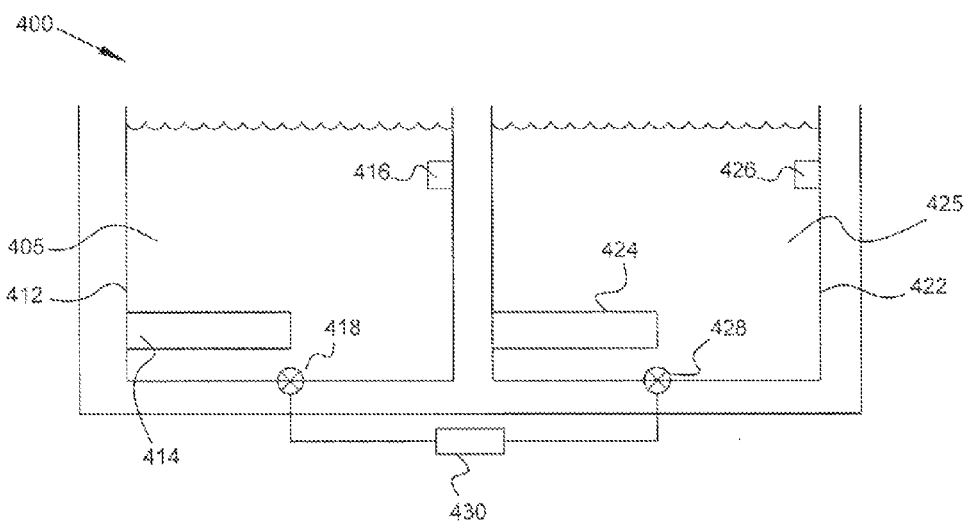
FIG. 4B is a front plan view of an example of a portion of a system for determining a load temperature according to embodiments of the present disclosure.

With reference now to FIG. 4B, a front plan view of an example of a portion of a system for determining a load temperature according to embodiments of the present disclosure is shown. In the illustrated embodiment, the system 400 includes a chamber 410. As shown, the chamber 410 can include sub-chambers 412 and 422. Each respective sub-chamber 412, 422 includes a respective medium 415, 425. In the illustrated embodiment, the respective media 415, 425 are liquid. As shown in FIG. 4B, the respective media can be introduced into the respective sub-chamber using a valve 418, 428 that can be connected to a holding tank 430. One or more respective temperature determining devices 416, 426 can be provided to determine the respective temperature of the respective media 415, 425 in the respective sub-chamber 412, 422. One or more respective temperature modifying devices 414, 424 can be provided to modify the respective temperature of the media 415, 425 in the respective sub-chamber 412, 422 to a respective predetermined medium temperature. In some embodiments, system 500 can include one or more respective medium level determining devices (not shown) (e.g. a high medium level determining device and a low medium level determining device) to determine the respective level of the media 415, 425 at one or more respective portions of sub-chambers 412, 422.

Processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Figure 5:
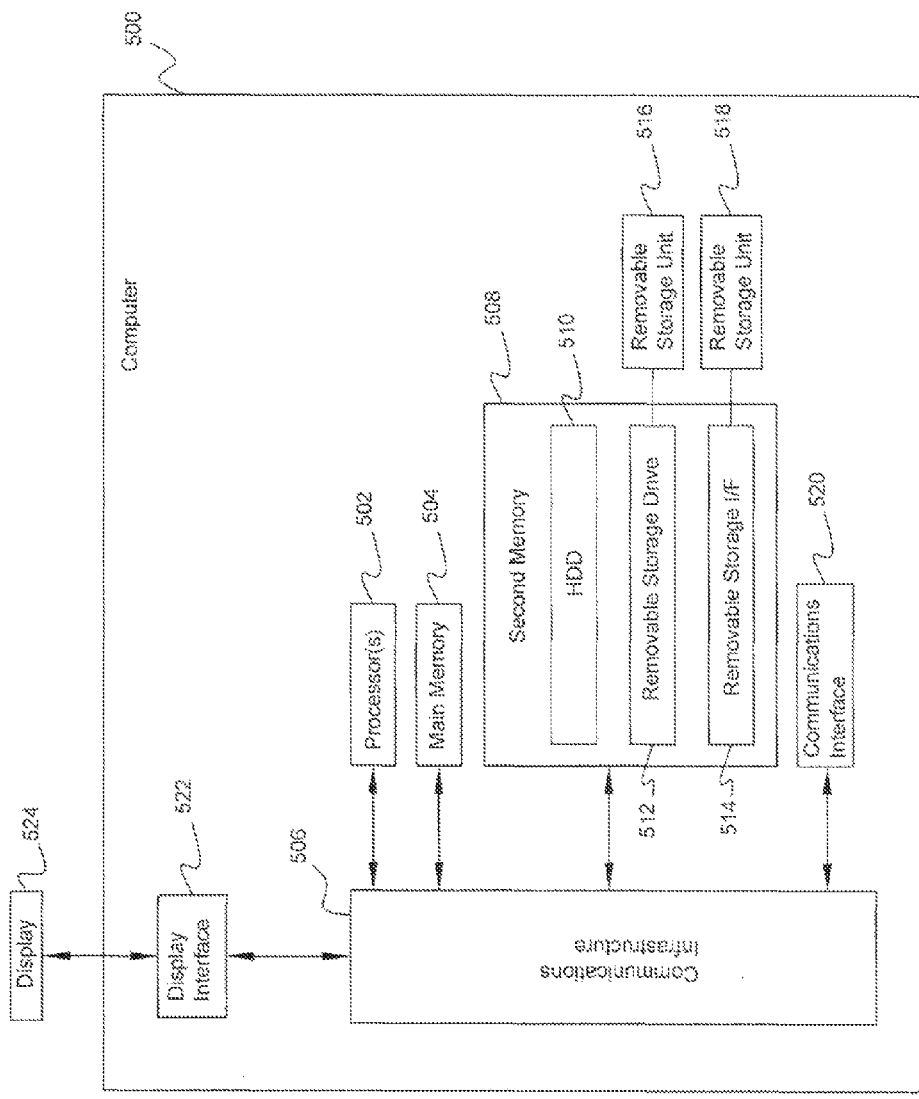
FIG. 5 is an illustrative example of an architecture of a computer processing unit according to some embodiments.

A diagram of an illustrative example of an architecture of a computer processing unit according to some embodiments is shown in FIG. 5. Embodiments of the subject matter and the functional operations for various steps of processes described in this specification can be implemented in electronic circuitry, or in computer firmware, or hardware, including the structures disclosed in this specification and their equivalents, or in combinations of one or more of them. Embodiments of the subject matter described in this specification can be implemented as one or more computer program products, i.e., one or more modules of computer program instructions encoded on a non-transitory, tangible machine readable storage medium for execution by, or to control the operation of, data processing apparatus. The non-transitory, tangible storage medium can be a non-transitory computer readable storage medium. The computer readable medium can be a machine-readable storage device, a machine-readable storage medium, a memory device (e.g., flash or random access memory), a hard disk drive, a tape drive, an optical drive (such as, but not limited to CDROM, DVD, or BDROM) or the like, or a combination of one or more of them.

At least a portion of the system for determining a load temperature described herein can be implemented in computer processing unit 500 and specifically in software and where results (e.g. steady state power output level, determined load temperature, medium circulation, medium level, medium temperature, etc.) can be presented to system operator on a graphical user interface (GUI) on a display device such as a computer monitor 524 or other display device. Embodiments of the subject matter described in this specification can be implemented on a computer 500 having a keyboard, pointing device, e.g., a mouse or a trackball, by which the operator can provide input to the computer. Other kinds of devices can be used to provide for interaction with an operator as well; for example, input from the operator can be received in any form, including acoustic, speech, or tactile input. In some embodiments, the computer system 500 includes functionality providing for various components of the systems for determining a load temperature and steps of the corresponding methods as described, for example, in FIGS. 1-3, and 7.

As illustrated in FIG. 5, computer processing unit 500 can include one or more processors 502. The processor 502 is connected to a communication infrastructure 506 (e.g., a communications bus, cross-over bar, or network). Computer processing unit 500 can include a display interface 522 that forwards graphics, text, and other data from the communication infrastructure 506 (or from a frame buffer not shown) for display on the display unit 524.

Computer processing unit 500 can also include a main memory 504, such as a random access memory (RAM), and a secondary memory 508. The secondary memory 508 can include, for example, a hard disk drive (HDD) 510 and/or removable storage drive 512, which can represent a floppy disk drive, a magnetic tape drive, an optical disk drive, or the like. The removable storage drive 512 reads from and/or writes to a removable storage unit 516. Removable storage unit 516 can be a floppy disk, magnetic tape, optical disk, or the like. As will be understood, the removable storage unit 516 can include a computer readable storage medium having stored therein computer software and/or data. Computer readable storage media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM, DVD-ROM, and BDROM disks. The processor 502 and the memory 504 can be supplemented by, or incorporated in, special purpose logic circuitry.

In alternative embodiments, secondary memory 508 can include other similar devices for allowing computer programs or other instructions to be loaded into computer processing unit 500. Secondary memory 508 can include a removable storage unit 518 and a corresponding interface 514. Examples of such removable storage units include, but are not limited to, USB or flash drives, which allow software and data to be transferred from the removable storage unit 518 to computer processing unit 500.

Computer processing unit 500 can also include a communications interface 520. Communications interface 520 allows software and data to be transferred between computer processing unit 500 and external devices. Examples of communications interface 520 can include a modem, Ethernet card, wireless network card, a Personal Computer Memory Card International Association (PCMCIA) slot and card, or the like. Software and data transferred via communications interface 520 can be in the form of signals, which can be electronic, electromagnetic, optical, or the like that are capable of being received by communications interface 520. These signals can be provided to communications interface 520 via a communications path (e.g., channel), which can be implemented using wire, cable, fiber optics, a telephone line, a cellular link, a radio frequency (RF) link and other communication channels.

The computer program products provide software to computer processing unit 500. Computer programs (also referred to as computer control logic) are stored in main memory 504 and/or secondary memory 508. Computer programs can also be received via communications interface 520. Such computer programs, when executed by a processor, enable the computer system 500 to perform features of the method discussed herein. For example, main memory 504, secondary memory 508, or removable storage units 516 or 518 can be encoded with computer program code for performing various steps of the processes described in FIGS. 1-3 and 7.

In an embodiment implemented using software, the software can be stored in a computer program product and loaded into computer processing unit 500 using removable storage drive 512, hard drive 510, or communications interface 520. The software, when executed by a processor 502, causes the processor 502 to perform the functions of various steps of the methods described herein. In another embodiment, various steps of the methods can be implemented primarily in hardware using, for example, hardware components such as a digital signal processor comprising application specific integrated circuits (ASICs). In yet another embodiment, the method is implemented using a combination of both hardware and software.

Various embodiments can be implemented in a computing system that includes a back end component, e.g., as a data server, or that includes a middleware component, e.g., an application server, or that includes a front end component, e.g., a computer having a GUI or a Web browser through which an operator can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Figure 6:
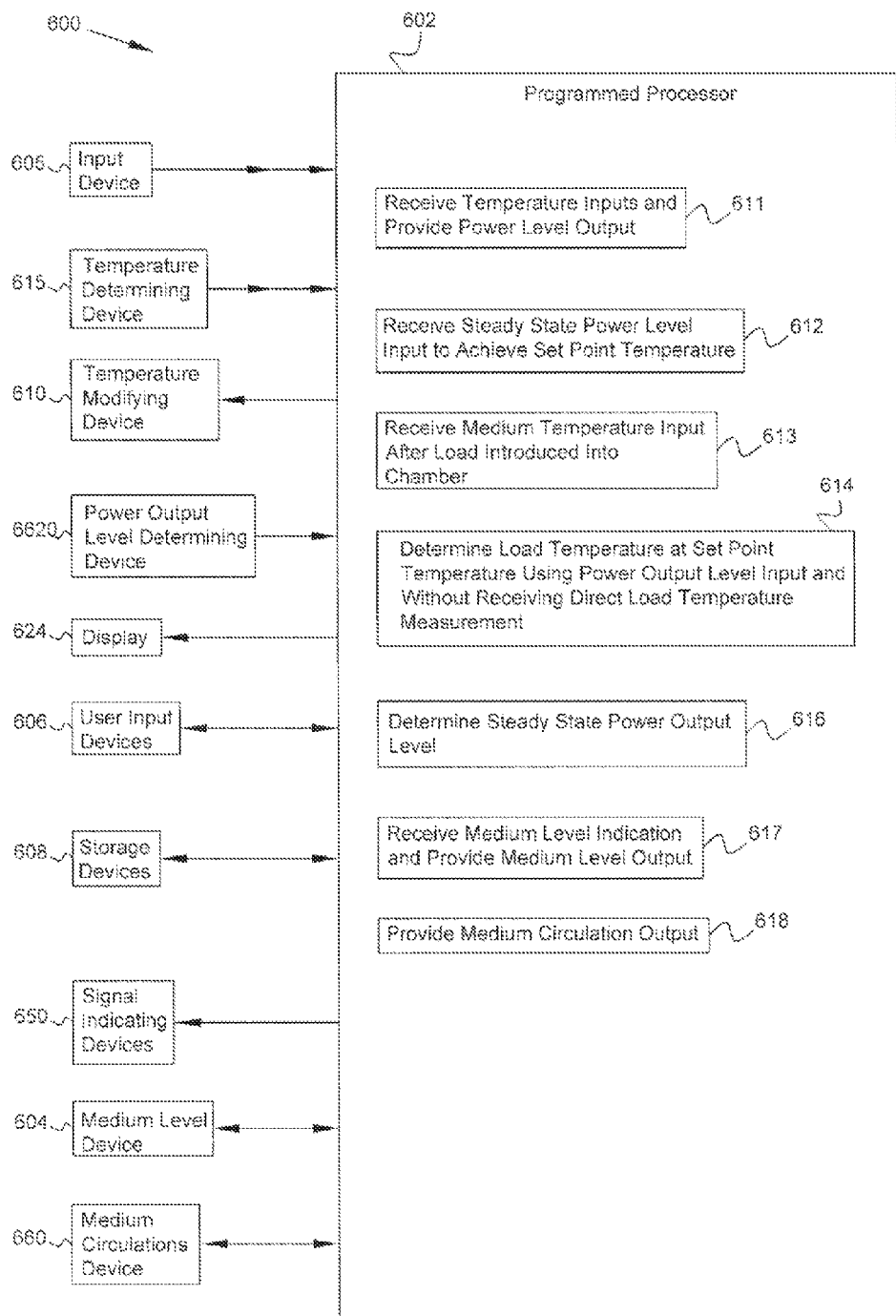
FIG. 6 is a block diagram of a processor system for performing a method described herein.

Many of the steps described above are adapted to be performed using a programmed processor of system 600. For example, FIG. 6 shows a processor 602 programmed to perform the method steps. The steps can be performed by a plurality of separate computer programs, or by a program that prompts the user for additional inputs between and/or during steps. These steps can include one or more of the receiving temperature inputs and providing a power level output 611, receiving a steady state power level input to achieve a predetermined medium temperature 612, determining a medium temperature (not shown), receiving a medium temperature input after a load is introduced into a chamber 613, determining a load temperature is at a predetermined medium temperature using a power output level input and without receiving any direct load temperature measurement 614, determining a steady state power output level 616, receiving a medium level indication and providing a medium level output 617, and providing a medium circulation output 618. In some embodiments, all numerically intensive calculations are performed by a programmed processor, and the results presented to the user (e.g., engineer) at certain decision points to allow input of engineering judgment. In the illustrated embodiment, the programmed processor 602 receives a variety of inputs including, but not limited to, an input from input device 605, temperature determining device 615, power output level determining device 620, user input device 606, storage device 608, and medium level device 604. As shown in FIG. 6, the programmed processor 602 can provide a variety of outputs including, but not limited to, an output to temperature modifying device 610, display 604, user input device 606, storage device 608, signal indicating device 650 and medium circulation device 660. Although FIG. 6 shows a single processor, in other embodiments, various subsets of the processes 611-618 can be executed on a plurality of programmed processors, which can optionally be connected to each other by a communications network, such as a personal area network, a local area network, a wide area network, and/or the Internet.

Referring now to FIG. 7, a diagram illustrating an example of a relationship between medium temperature, time and power output level for determining a load temperature in a chamber is provided. As shown in FIG. 7, a power output is applied to a medium in a chamber to achieve the predetermined medium temperature. At a time between 0 minutes to 45 minutes, a power output level of 100% of maximum power output is applied to a medium in a chamber to raise the medium temperature to achieve a predetermined medium temperature of 150° Fahrenheit. As shown in FIG. 7, at a time between 45 minutes and 60 minutes, and at a medium temperature between 90° Fahrenheit and 120° Fahrenheit, the system reduces the power output level between 100% and 50% of maximum power output. In the illustrated embodiment, at a time between 60 minutes and 75 minutes, and at a medium temperature between 120° Fahrenheit and 150° Fahrenheit, the system reduces the power output level between 50% and 5% of maximum power output as the medium temperature approaches the predetermined medium temperature. The system determines that the steady state power level is at 5% of maximum power output as this is the power output level to maintain the medium temperature. Substantially constant about the predetermined medium temperature of 150° Fahrenheit given system errors and/or system natural losses of energy.

At a time of 135 minutes, a load (a food product in a sous vide package) is received into the medium in the chamber. As shown in FIG. 7, the medium temperature reduces from the predetermined medium temperature of 150° Fahrenheit due to the introduction of the cooler load mass. At the time of reception of the load into the medium, the power output level of 100% of maximum power output is applied to the medium in the chamber to return the medium temperature to the predetermined medium temperature. Between a time of 165 minutes and 240 minutes, and at a medium temperature between 130° Fahrenheit and 150° Fahrenheit, the system reduces the power output level between 50% and 10% of maximum power output as the medium temperature approaches the predetermined medium temperature of 150° Fahrenheit. At a time of 240 minutes, the medium temperature reaches the predetermined medium temperature of 150° Fahrenheit but the power output level indicates that the power output level has not returned to the steady state power output level of 5% of maximum power output. The system continues to monitor the power output level and at a time of 255 minutes, the system receives an indication that the power output level has returned to the steady state power output level of 5% and determines that the load temperature is at the predetermined medium temperature of 150° Fahrenheit. At a time of 255 minutes, a signal indicator can be provided to indicate that the steady state power output level has been achieved, and a timer may be provided so that known time/temperature curves may be utilized to set and measure the time the load in the bath is maintained at the predetermined medium temperature of 150° so as to ensure harmful bacteria and parasites are neutralized.

In some embodiments, steps of the method can be implemented (e.g., controlled and/or monitored) by a general purpose computer programmed in accordance with the principals discussed herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Some embodiments provide a computer-implemented method of determining a temperature of a load introduced into a chamber. A power output is applied to a medium in at least a portion of a chamber at a level to modify the temperature of the medium to achieve a predetermined medium temperature. A steady state power output level is determined to achieve the predetermined medium temperature using a computer processor. A load having a load temperature other than the predetermined medium temperature is introduced into the at least a portion of the chamber. The load temperature is determined to be at the predetermined medium temperature using the computer processor when the power output level reaches the determined steady state power output level and the method performs this step without any direct temperature measurement of the load.

Some embodiments provide a system for determining a temperature of a load introduced into a chamber. The system includes a chamber including a medium in at least a portion of the chamber, an input device to provide a predetermined medium temperature for the medium, a temperature modifying device to modify the temperature of the medium in the at least a portion of the chamber to the predetermined medium temperature, a temperature determining device to determine the temperature of the medium in the at least a portion of the chamber, a power output level determining device to determine the power output level provided to the temperature modifying device and a computer-readable storage medium having instructions stored therein. The instructions, when executed by a computer processor, cause the computer processor to receive a steady state power output level input to achieve the predetermined medium temperature from the power output level determining device, receive a medium temperature input from the temperature determining device after a load having a temperature other than the predetermined medium temperature is introduced into the at least a portion of the chamber, and determine that the load temperature is at the predetermined medium temperature when the power output level determining device indicates that the power output level has returned to the received steady state power output level and without receiving any direct temperature measurement input of the load.

Some embodiments provide a computer-implemented method of determining a temperature of a load introduced into a chamber. The method includes introducing a medium into one or more of a plurality of sub-chambers of a chamber and applying a power output to the respective medium of the one or more sub-chambers at a level to modify the temperature of the respective medium to achieve a respective predetermined medium temperature. The respective medium temperature in the one or more sub-chambers is monitored. The respective power output level applied to the respective medium of the one or more sub-chambers is monitored. A respective steady state power output level to achieve the respective predetermined medium temperature in the one or more sub-chambers is determined using the respective monitored medium temperature and the respective monitored power output level as inputs to a computer processor. A respective load having a load temperature other than the predetermined medium temperature is introduced into each of the one or more sub-chambers. The respective load temperature is determined to be at the respective predetermined medium temperature by the computer processor when the respective power output level reaches the respective determined steady state power output level without any direct temperature measurement of the respective load.

While various embodiments are described herein, it is to be understood that the embodiments described are illustrative only and that the scope of the subject matter is to be accorded a full range of equivalents, many variations and modifications naturally occurring to those of skill in the art from a perusal hereof.

What I claim is:

1. A computer-implemented method of determining a temperature of a load introduced into a chamber, comprising:
    applying a power output to a temperature modifying device to modify the temperature of a surrounding medium disposed in at least a portion of a chamber to achieve a predetermined surrounding medium temperature;
    determining a steady state power output level to achieve the predetermined surrounding medium temperature;
    receiving a sealed package having a load disposed therein at a load temperature other than the predetermined surrounding medium temperature into the surrounding medium; and
    determining that the load temperature is substantially at the predetermined surrounding medium temperature when the power output level applied to the temperature modifying device reaches the determined steady state power output level and without any direct temperature measurement of the load.

2. The method of claim 1, further comprising:
    circulating the surrounding medium within the at least a portion of the chamber.

3. The method of claim 1, further comprising:
    providing a chamber comprising a plurality of sub-chambers;
    introducing a respective surrounding medium into each of the plurality of sub-chambers; and
    monitoring the respective surrounding medium temperature in each of the plurality of sub-chambers with a respective temperature monitoring device disposed in the respective sub-chamber of the plurality of sub-chambers.

4. The method of claim 1, further comprising:
    monitoring the power output level applied to the temperature modifying device to return the surrounding medium temperature to the predetermined surrounding medium temperature.

5. The method of claim 1, wherein the step of determining the steady state output power level further comprises:
    monitoring the surrounding medium temperature;
    monitoring the power output level applied to the temperature modifying device; and
    determining the steady state power output level by determining the power output level required to apply to the temperature modifying device to maintain the surrounding medium temperature substantially constant about the predetermined surrounding medium temperature.

6. The method of claim 5, further comprising:
    maintaining the steady state power output level for a predetermined period of time.

7. The method of claim 6, wherein the predetermined period of time is an amount of time suitable for neutralizing at least one of bacteria or parasites.

8. The method of claim 1, wherein the step of applying a power output further comprises:
    applying a power output to the temperature modifying device to raise the surrounding medium temperature.

9. The method of claim 1, wherein the step of applying a power output further comprises:
    applying a power output to the temperature modifying device to lower the surrounding medium temperature.

10. The method of claim 1, further comprising:
    providing a signal indicating that the steady state power output level has been achieved.

11. The method of claim 10, further comprising:
automatically activating a timer when the signal is received, wherein the timer is set for a predetermined period of time; and
the activated timer automatically providing a signal when the predetermined period of time expires.

12. The method of claim 1, wherein the surrounding medium is a gaseous medium.

13. The method of claim 1, wherein the surrounding medium is a liquid medium.

14. The method of claim 13, wherein the load comprises a food product inside the sealed package.

15. The method of claim 1, wherein the step of receiving further comprises receiving a plurality of sealed packages, each having a load respectively disposed therein at a respective load temperature other than the predetermined surrounding medium temperature, into the surrounding medium at substantially the same time and wherein the step of determining further comprises determining that each respective load temperature is substantially at the predetermined surrounding medium temperature when the power output level applied to the temperature modifying device reaches the determined steady state power output level and without any direct temperature measurement of any of the plurality of loads.

16. The method of claim 1, further comprising:
removing the sealed package;
receiving another sealed package having another load disposed therein at another load temperature other than the predetermined surrounding medium temperature into the surrounding medium; and
determining that the another load temperature is substantially at the predetermined surrounding medium temperature when the power output level applied to the temperature modifying device reaches the determined steady state power output level and without any direct temperature measurement of the another load.

17. The method of claim 1, wherein the predetermined surrounding medium temperature is measured by a temperature determining device disposed in the at least a portion of the chamber.

18. A computer-implemented method, comprising:
introducing a surrounding medium into a chamber;
modifying the temperature of the surrounding medium using a temperature modifying device to achieve a predetermined surrounding medium temperature;
monitoring the surrounding medium temperature in the chamber;
monitoring the power output level applied to the temperature modifying device
determining a steady state power output level to achieve the predetermined surrounding medium temperature in the chamber using the monitored surrounding medium temperature and the monitored power output level applied to the temperature modifying device as inputs to a computer processor;
receiving a plurality of loads, each having a respective load temperature other than the predetermined surrounding medium temperature into the surrounding medium the; and
determining that each of the respective load temperatures is substantially at the predetermined surrounding medium temperature using the computer processor when the power output level applied to the temperature modifying device reaches the determined steady state power output level and without any direct temperature measurement of any of the respective loads.

* * * * *